T. E. BARNUM.
MOTOR CONTROLLER.
APPLICATION FILED NOV. 8, 1909.

999,947.

Patented Aug. 8, 1911.
5 SHEETS—SHEET 1.

Fig. 1.

Witnesses.
George Haynes
S. W. Fitzgerald

Inventor:
Thomas E. Barnum.
By Edwin B. Fanning Jr.
Atty

T. E. BARNUM.
MOTOR CONTROLLER.
APPLICATION FILED NOV. 8, 1909.

999,947.

Patented Aug. 8, 1911.
5 SHEETS—SHEET 4.

Fig. 4.

Witnesses:
George Haynes
J. W. Fitzgerald

Inventor.
Thomas E. Barnum
By Edwin P. H. Tower, Jr.
Atty.

UNITED STATES PATENT OFFICE.

THOMAS E. BARNUM, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

999,947.

Specification of Letters Patent.    Patented Aug. 8, 1911.

Application filed November 8, 1909. Serial No. 526,768.

*To all whom it may concern.*

Be it known that I, THOMAS E. BARNUM, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

My invention relates to improvements in controllers for electric motors.

One object of my invention is to provide a simple and reliable controller which may be set to start the motor and then automatically stop the same after it has made any desired number of revolutions.

Another object of my invention is to insure the operation of the automatic member of the controller in synchronism and in step with the motor controlled thereby under all conditions.

Various other objects and advantages of my invention will be hereinafter fully and clearly set forth.

My invention is particularly appropriate for controlling the steering apparatus of ships, but it should be understood that my invention is not limited in its application to any particular class of motor operated devices.

For the purpose of disclosing the characteristic features of my invention, I shall describe the device illustrated in the accompanying drawing which embodies my invention in its preferred form. It should be understood, however, that my invention is not limited to the particular construction shown, but is susceptible of various modifications.

The several views in the accompanying drawing are as follows.

Figure 1:
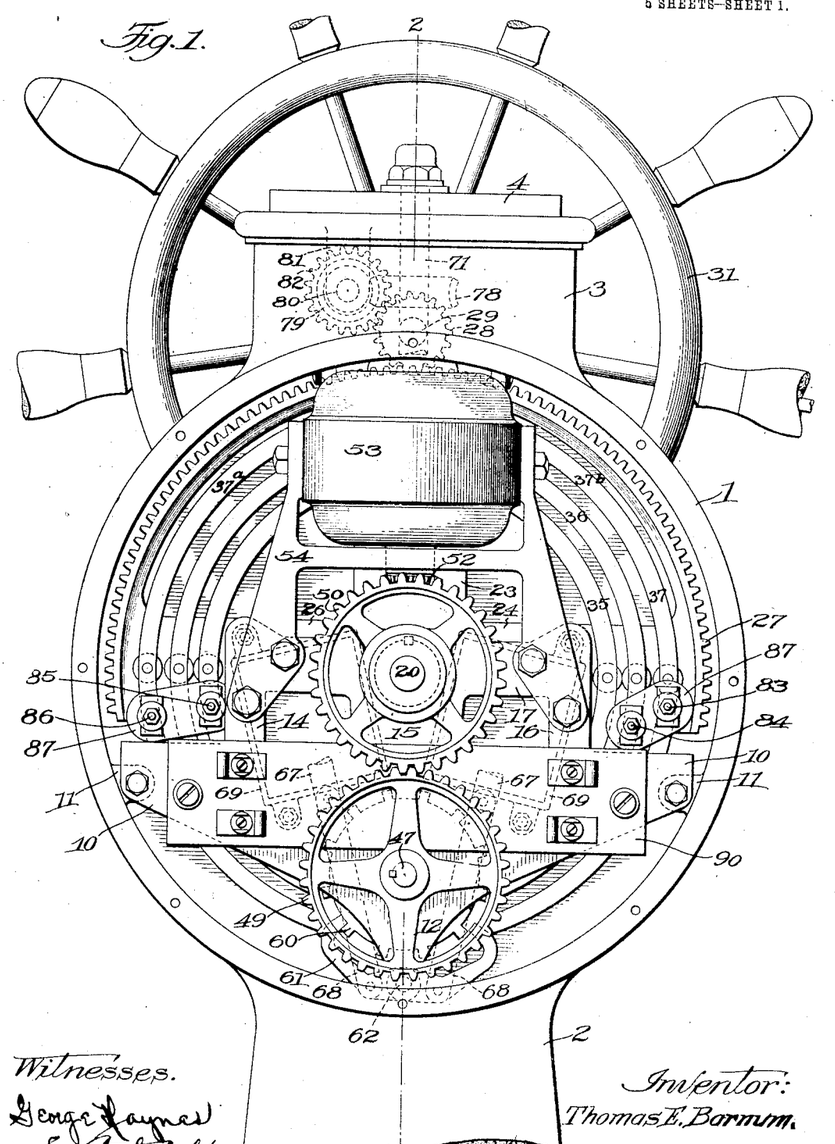
Figure 1 is a front elevation of the device with a portion of the casing removed to illustrate the interior mechanism.
Figure 2:
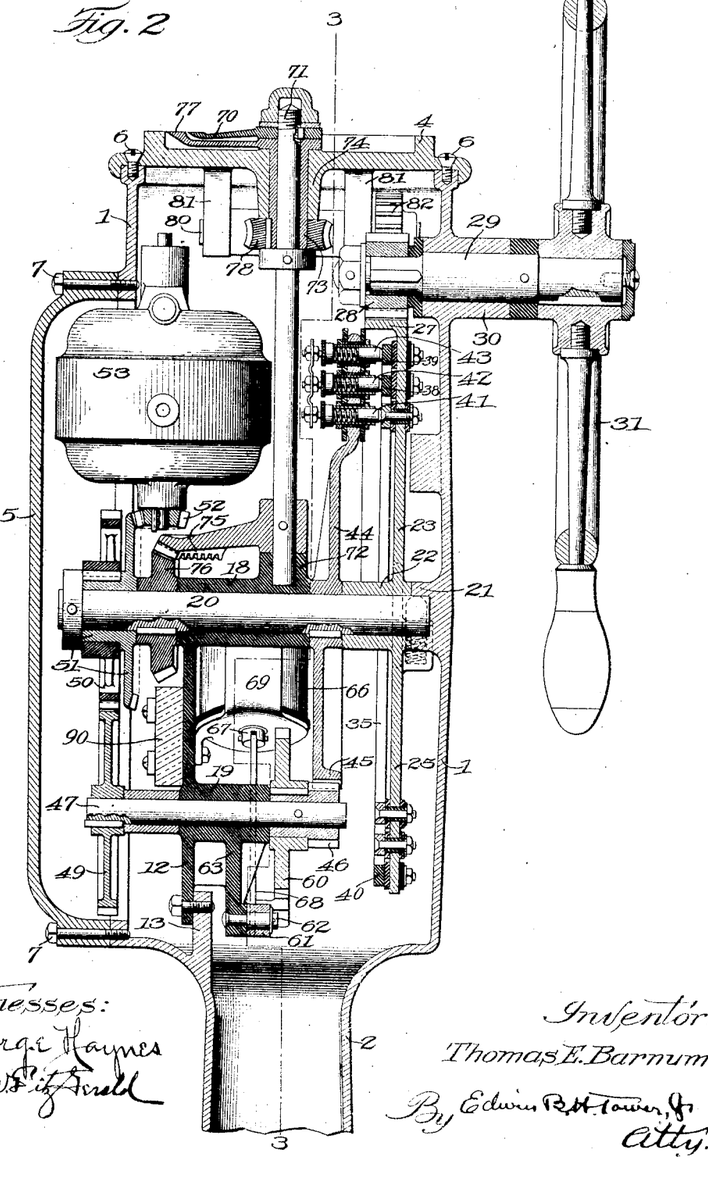
Fig. 2 is a vertical sectional view taken on line 2—2, Fig. 1.

The mechanism to be hereinafter described may be conveniently mounted in a suitable inclosing casing. As illustrated, the inclosing casing is in the form of a steering column provided with an enlarged cylindrical portion 1, having a suitable standard 2 and an upwardly extending cylindrical top portion 3. Of course, the casing may be formed in any preferred manner. As illustrated, the main portions of the casing are formed integrally, while the top 4 and front 5 thereof are detachable to give access to the interior mechanism. These detachable parts may be secured to the casing in any preferred manner, as by means of screws 6 and bolts 7. Arranged within the cylindrical portion of the casing and supported therein, in a manner hereinafter described, is a supporting frame for the several parts of the mechanism. The general shape of the supporting frame is best illustrated in Fig. 1. The base 10 of the frame extends substantially the entire width of the cylindrical portion of the casing and is bolted at opposite ends to lugs 11, projecting from the inner walls of said casing. The base is also provided with a downwardly extending portion 12, which is also bolted as illustrated in Fig. 2, to a lug 13, projecting from the inner wall of said casing. Projecting upwardly from the base of the frame are extensions 14, 15 and 16 arranged to support a cross member 17. Referring now, to Fig. 2, in which the frame is shown in section in heavy lines, it will be seen that the portion 17 of the frame carries a rearwardly extending hollow cylindrical portion 18, while the base of the frame carries a rearwardly extending hollow cylindrical portion 19. The portions 18 and 19 of the frame, as will be hereinafter set forth, form bearings for suitable shafts. In practice, I prefer to form the several parts of the supporting frame integrally, but, of course, the same might be formed in various other ways. As above set forth, the frame is rigidly connected to the inclosing casing at three points, and, therefore, the same will be firmly held in place, and capable of supporting the various parts hereinafter set forth.

Revolubly mounted in the hollow cylindrical portion 18 of the frame is a shaft 20, the rear end of which projects into a suitable bearing 21, provided on the rear wall of the casing and preferably formed integrally therewith. The provision of the bearing 21 relieves the frame to a great extent of the weight of the mechanism within the casing.

The forward end of the shaft 20 is projected beyond the front of the frame to carry the gears hereinafter specified. Loosely mounted on the rear end of the shaft 20, adjacent to the bearing 21, is a spider 22 preferably provided with four radially extending arms 23, 24, 25 and 26, best illustrated in Fig. 3. The arms 23, 24 and 26 carry a gear segment 27, the teeth of which are arranged to mesh with a pinion 28 keyed, or otherwise rigidly secured, to a spindle 29. The spindle 29 is revolubly mounted in a bearing 30 provided on the back of the inclosing casing and preferably formed integrally therewith. The shaft 29 projects beyond the bearing 30 and carries at its rear end a hand wheel 31 which is keyed, or otherwise rigidly secured, thereto. Of course, any other suitable operating device might be used instead of the wheel illustrated. The arms of the spider 22 also carry concentric contact rings 35, 36 and 37, all of which are preferably insulated therefrom. The ring 35 is continuous, while the ring 36 is continuous, with the exception of an insulated portion 38 in alinement with the arm 23 of the spider. The ring 37 is formed of two substantially semicircular sections 37ª and 37ᵇ, between the ends of which are inserted suitable insulating blocks 39 and 40, said insulating blocks being in alinement with the insulating portion 38 of the ring 36. The contact rings 35, 36 and 37 are arranged to be engaged by suitable contact buttons 41, 42 and 43 respectively. These contact buttons are carried by a member 44 which is keyed, or otherwise rigidly mounted on the shaft 20. The contact buttons are preferably yieldingly mounted in the member 44. The member 44 is provided with a gear segment 45, preferably semicircular. The teeth of the gear segment 45 are arranged to mesh with a pinion 46 keyed, or otherwise rigidly secured, to a spindle 47. The spindle 47 is revolubly mounted in the hollow cylindrical portion 19 of the supporting frame. The forward end of the shaft 47 is projected beyond the supporting frame and has keyed, or otherwise rigidly secured thereto, a gear wheel 49. The gear wheel 49 is arranged to mesh with a gear wheel 50 which is keyed, or otherwise rigidly mounted, on the hub of a bevel gear 51, which, in turn, is loosely mounted on the forward end of the shaft 20. The bevel gear 51 is arranged to mesh with a bevel pinion 52 which is rigidly mounted on the armature shaft of an electric motor 53. The motor 53 is provided for operating the shaft 47 and also various other parts hereinafter to be described. In practice, the motor may be mounted in any preferred manner. As illustrated in Fig. 1, I have shown the motor mounted in a suitable supporting frame 54, said frame being bolted or otherwise rigidly secured to the upper part of the main supporting frame hereinbefore described. The motor 53 may be of any preferred type. With the arrangement of gears heretofore described, it will be seen that the motor drives the shaft 47, which, in turn, through the pinion 46 and gear segment 45, operates the member 44 carrying the contact buttons before mentioned.

As will be hereinafter set forth, in order to insure the proper operation of the controller, it is necessary to retard the operation of the member carrying the contact buttons so that the same will move in synchronism with the working motor. This, of course, may be accomplished in various different ways, but, in practice, I prefer to provide the means which I shall now describe. The retarding means illustrated comprises an escapement wheel 60 which is keyed, or otherwise rigidly secured, to the hub of the pinion 46. The movement of the escapement wheel 60 is controlled by a double escapement pawl 61 which is pivoted centrally on a pin 62 carried by a downwardly extending lug 63 of the main supporting frame. The escapement wheel and pawl are best illustrated in Fig. 2. For rocking the escapement pawl, I have provided a pair of solenoids 65 and 66, each having a movable plunger 67, connected by a link 68 to said escapement pawl, said links 68 being connected to said pawl on opposite sides of its pivotal point. With this arrangement, it will be seen that alternate energization of the solenoids 65 and 66 will cause the escapement pawl to be rocked to permit a step-by-step movement of the escapement wheel. The solenoid windings are illustrated as mounted in suitable frames 69, which may be bolted, or otherwise rigidly secured, to the main supporting frame, as illustrated in dotted lines in Fig. 1. The function of the escapement mechanism just described will be hereinafter more fully set forth.

In addition to operating the contact member 44, the motor 53 is arranged to also operate a suitable indicating device, which I shall now describe. The indicating device comprises a small pointer 70 keyed, or otherwise rigidly secured, to the upper extremity of a spindle 71 which extends through the top 4 of the casing. The spindle 71 is arranged vertically within the casing and has its lower end revolubly mounted in a suitable bearing 72, provided on the main supporting frame. The upper end of the spindle has a bearing in a cylindrical sleeve 73, which, in turn, is loosely mounted within a bearing 74 depending from and preferably formed integrally with the top 4 of the casing. Adjacent to its lower end, the spindle 71 has rigidly secured thereto a bevel gear segment 75, the teeth of which are arranged to mesh with a bevel gear 76, keyed, or otherwise rigidly secured, to the shaft 20. As has already been set forth, the contact member 44 is keyed to the shaft 20 and, consequently, when said contact member is moved, the shaft 20 will be revolved. This causes the bevel gear 76 to be revolved, which, in turn, imparts movement through the bevel gear segment 75 to spindle 74 and the pointer 70. Hence, the pointer 70 will move in synchronism with the contact member 44. The purpose of the pointer 70 will be hereinafter more clearly set forth.

Figure 4:
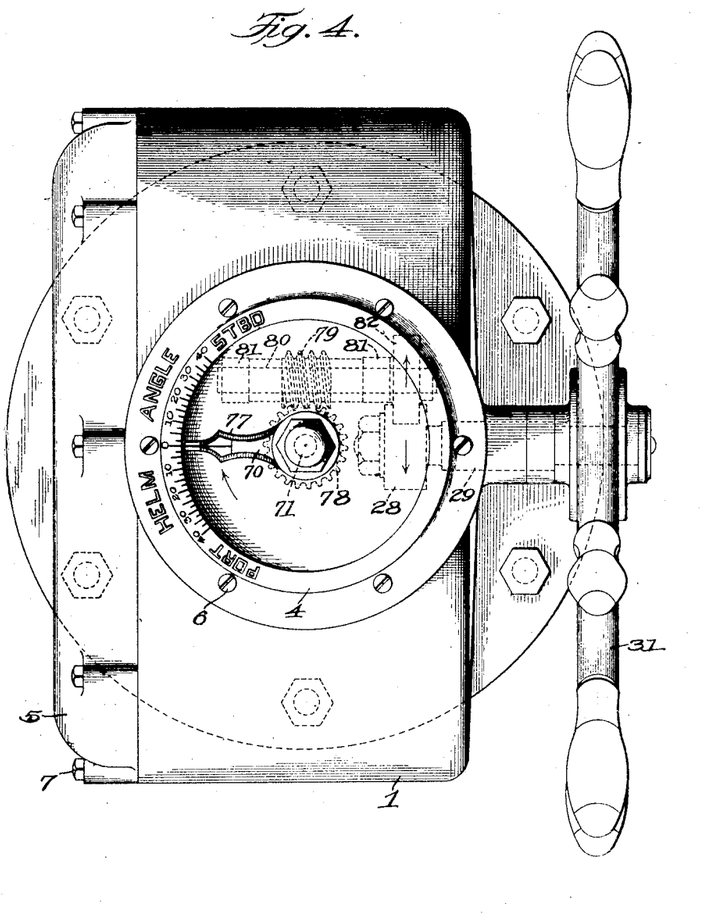
Fig. 4 is a top plan view of the device.

In addition to the pointer 70, I preferably provide another pointer 77, mounted concentrically with and below the pointer 70. The pointer 77 may be secured to or formed integrally with the sleeve 73. The sleeve 73 carries at its lower end a worm wheel 78 arranged to be operated by a worm 79, best illustrated in Fig. 4. The worm 79 is rigidly mounted on a spindle 80 supported by lugs 81 depending from the top 4 of the casing. At its rear end, the spindle 80 is provided with a pinion 82, the teeth of which are arranged to mesh with the pinion 28 on the shaft 29. Hence, the pointer 77 will move in synchronism with the steering wheel.

Figure 3:
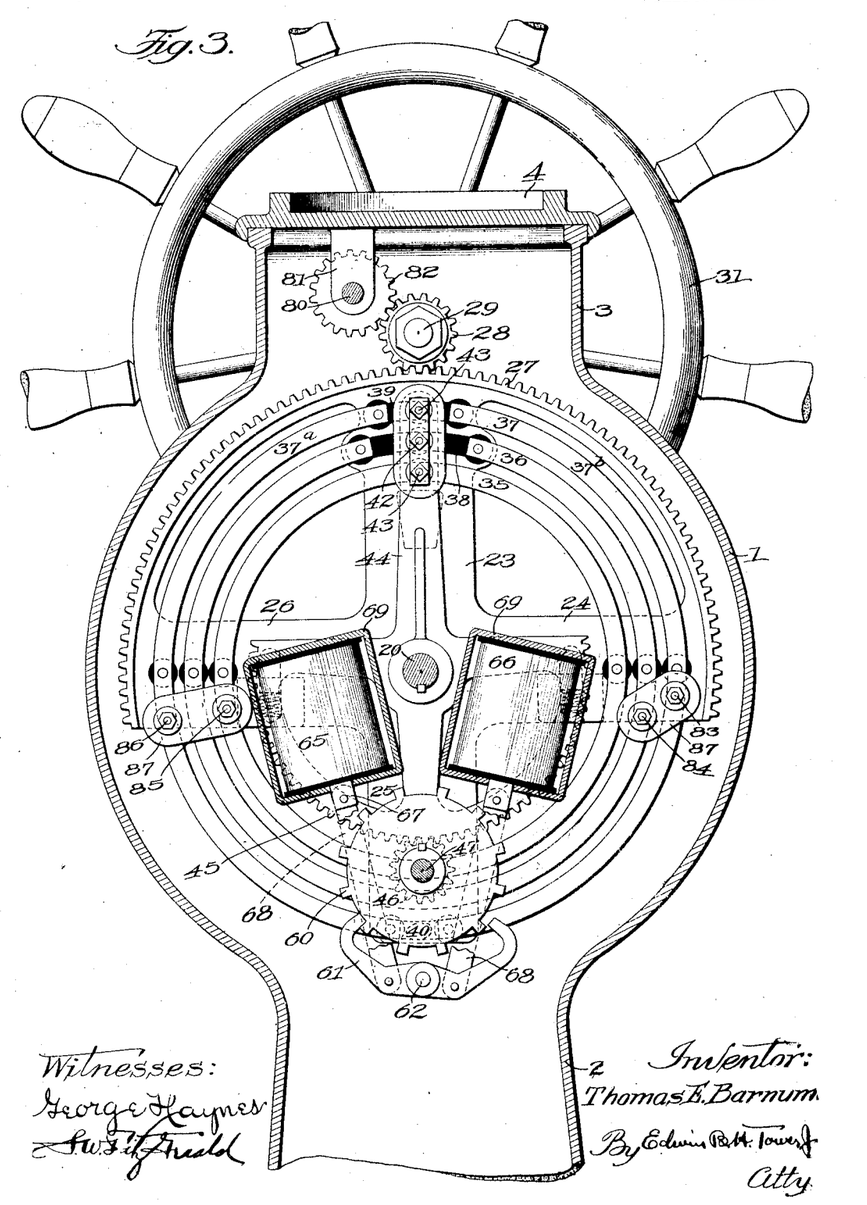
Fig. 3 is a vertical sectional view taken on line 3—3, Fig. 2.

For connecting the contact rings in circuit, I have shown suitable contact brushes 83, 84, 85 and 86 best illustrated in Figs. 1 and 3. The brushes 83 and 86 engage the sections 37$^b$ and 37$^a$ respectively of ring 37, while the brushes 84 and 85 engage the rings 36 and 35 respectively. These brushes may be mounted on stationary brackets 87. For facilitating the making of the circuit connections hereinafter set forth, I have provided a suitable connection board 90, secured to the base of the main supporting frame, as illustrated in Fig. 1.

I shall now describe in general the functions and operation of the mechanism above set forth. The contact rings and contact buttons are adapted to control, through suitable instrumentalities, the circuit of the working motor to cause the same to operate in either direction according to the direction in which the contact rings are moved. So long as the contact buttons are in engagement with the contact rings, the working motor will be maintained operative; but, as soon as the contact buttons move onto the insulated portions of the rings, the motor will be stopped. It may be assumed that the small motor 53, hereinafter referred to as "the pilot motor", constantly tends to rotate the contact member 44, so that immediately upon the operation of the escapement pawl, said contact member will move in one direction or the other according to the direction of operation of the motor 53. In practice, the solenoids for operating the escapement mechanism may be controlled by a commutator, or other suitable device, operated by the working motor so that the contact member 44 will move step by step in synchronism with the motor. This arrangement insures a certain number of revolutions of the working motor during each step in the operation of the contact member. It has previously been pointed out that the small pointer 70 moves in synchronism with the contact member 44, and, consequently, said pointer will also move in synchronism with the working motor.

Assuming, now, that the contact member 44 and the contact rings are as illustrated in Fig. 3, the motor may be started by turning the steering wheel in one direction or the other according to the direction in which it is desired to operate the working motor. Movement of the steering wheel causes the pinion 28 to revolve, thereby turning the spider which carries the contact rings and moving the contact rings into engagement with the contact buttons. Also upon operation of the steering wheel, the pointer 77 is operated through the pinion 82, worm 79 and worm wheel 78. The pointer 77 thus indicates the degree of movement of the spider carrying the contact rings. As will be hereinafter set forth, the range of operation of the motor is governed by the movement of the contact rings. Consequently, if it is desired to move the rudder or other device operated by the working motor ten degrees, the steering wheel should be moved until the pointer 77 reaches the ten degree mark on the scale provided on the top of the casing. Assuming that the operating handle be revolved to bring the pointer 77 to the ten degree mark, the working motor will be started, thereby setting in operation the escapement mechanism. The contact member 44 will thereupon move step by step until it disengages the contact rings 37 and 36, whereupon the working motor will be stopped automatically. The stopping of the working motor causes the escapement mechanism to cease operating, thereby preventing any further movement of the contact member 44. As the pointer 70 moves in synchronism with the working motor, when the working motor is stopped, said pointer should be directly in alinement with the pointer 77, thus indicating that the device operated by the working motor has been brought to the desired position. As the pointer 70 moves in synchronism with the working motor, it indicates the position of the device operated by the motor at all times.

Figure 5:
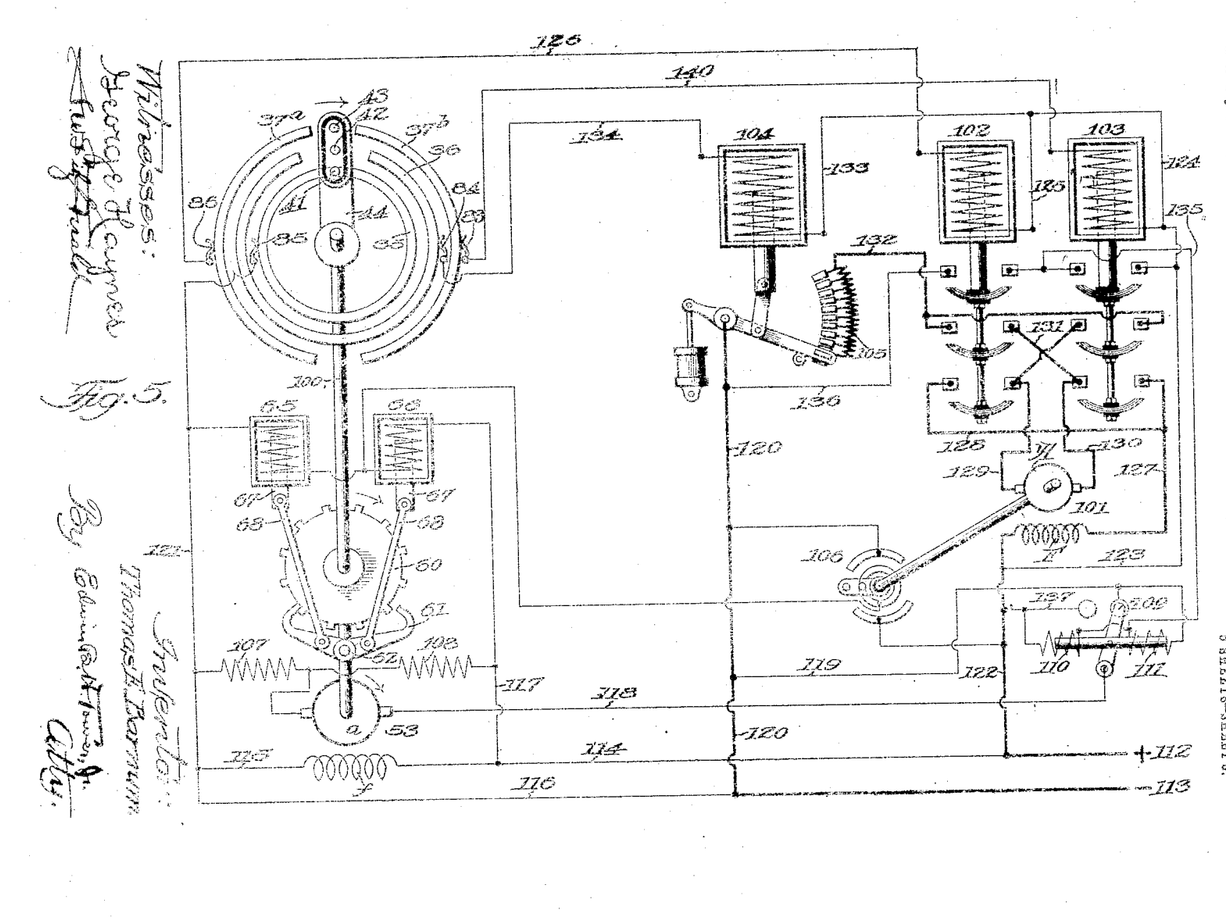
Fig. 5 illustrates diagrammatically one circuit arrangement of the device.

I shall now more fully describe the operation of the controller, reference being had to Fig. 5, which diagrammatically illustrates one circuit arrangement therefor. In this view, I have shown the controller heretofore described in a schematic way, the contact member 44 and escapement wheel 60 being illustrated as connected to a shaft 100 operated by the pilot motor 53. The device is arranged to control a working motor 101, having an armature A and a series field winding F. While I have shown a plain series motor, it should be understood that my invention is applicable to other types of motors. The motor 101 may be assumed to operate the rudder of a ship or any other device. While any preferred means may be employed for controlling the direction of the flow of current through the motor 101, for the purpose of illustration, I have shown a pair of electromagnetically operated reversing switches 102 and 103, the energizing circuits of which, as will be hereinafter set forth, are controlled by the contact member 44 and contact rings. Also, I may provide any suitable device for accelerating the motor. In the present instance, however, I have merely shown a simple electromagnetically operated starting device 104 for removing a starting resistance 105 from the motor circuit. As will be hereinafter explained, the starting device 104 is also controlled by the contact member 44 and the contact rings. For controlling the operating solenoids 65 and 66 of the escapement mechanism, I have shown a simple form of commutator 106 adapted to be operated by the motor 101. Of course, in practice, the commutator may be operated either by the motor or by the driven mechanism and may be connected thereto through suitable gearing for giving the desired speed ratio. In practice, the circuits of the solenoids 65 and 66 may be opened and closed alternately by the commutator, or the solenoids may be permanently connected in circuit and arranged to be alternately short-circuited by the commutator. In the drawing I have shown the latter arrangement.

As diagrammatically illustrated, the pilot motor 53 is of the shunt wound type, being provided with an armature $a$ and a shunt field winding $f$. Of course, in practice, other types of motors might be used if preferred, but I have found the shunt wound motor to be the most practical. In practice, I might provide any suitable means for connecting and disconnecting the motor 53 from circuit, but I prefer to connect the motor permanently in circuit and to provide suitable resistances 107 and 108 for protecting the same when it becomes stalled by the escapement mechanism. The motor 53 must be adapted to operate in either direction, and I, therefore, provide a suitable reversing switch 109 for controlling the direction of operation thereof. Of course, any preferred type of reversing switch might be employed. The reversing switch illustrated is provided with operating windings 110 and 111 which may be controlled in any suitable manner. As will be hereinafter more clearly set forth, it is essential to the proper operation of the controller that the reversing switch 109 be maintained in the same position so long as the corresponding reversing switch of the main motor remains closed. I, therefore, prefer, to connect the windings of the reversing switch 109 in such a manner that the energization thereof will be controlled by the reversing switches 102 and 103. This I accomplish in the manner hereinafter set forth.

Assuming that current is supplied to the several electromagnetic devices from main lines 112 and 113 with the controller and the several switches in the position illustrated, no current will flow through the working motor. Under these conditions, however, the pilot motor will be connected in circuit and will be stalled by the escapement mechanism. The circuit of the shunt field winding of the pilot motor may be traced from main line 112, by conductor 114, through the shunt field winding $f$, by conductors 115 and 116 to main line 113. The armature circuit of the pilot motor may be traced from conductor 114, by conductor 117, through the resistance 108 and armature $a$, by conductor 118, through switch 109, by conductor 119 to conductor 120, and thence to main line 113. The resistance 108, as well as the resistance 107, is so proportioned as to fully protect the motor while it is stalled by the escapement mechanism. Under these conditions, circuit is also closed from conductor 117, through the escapement magnets 65 and 66 in series, by conductor 121 to conductor 116.

To start the working motor, it is necessary to move the spider carrying the contact rings in one direction or the other according to the direction in which it is desired to operate the working motor. Assuming that the spider is moved in a clock-wise direction, circuit will first be closed from main line 112, by conductors 122, 123, 124 and 125 through the operating winding of reversing switch 102, by conductor 126 to contact segment 37$^a$, thence through brushes 43 and 41 of the contact member 44 to contact ring 35, and thence by brush 85 to conductor 121 to main line 113 as already traced. Thereupon the switch 102 responds, thereby closing the motor circuit, which may be traced from conductor 122, through the series field winding F, by conductors 127 and 128, through the lowermost contact of switch 102, by conductor 129, through the armature A, by conductors 130 and 131, through the intermediate contact of switch 102, by conductor 132, through the resistance 105 to conductor 120. The motor is thus started with all of the starting resistance connected in circuit. However, as soon as the contact rings are moved sufficiently to cause the ring 36 to engage contact brush 42 of the contact member 44, circuit will be closed through the operating winding of the rheostat 104. This circuit may be traced, as already described, to conductor 124, thence by conductor 133 through the operating winding of the rheostat, by conductor 134 to contact ring 36, thence by brushes 42 and 41 of the contact member 44, to contact ring 35, thence to the negative side of the line as already traced. Thereupon the starting resistance is removed from the motor circuit and the motor brought up to normal speed. Simultaneously with the closure of the motor circuit, circuit is completed through the operating winding 110 of the reversing switch 109 of the pilot motor. This circuit may be traced from conductor 122 through the operating winding 110, by conductor 135, through the uppermost contact of reversing switch 102, by conductor 136 to conductor 120. Thereupon the reversing switch 109 is shifted to the left from the position in which it is illustrated. Thereupon circuit is closed through the armature of the pilot motor in a direction opposite to that previously traced. Circuit may now be traced through the motor armature from main line 112, by conductors 122 and 137, through reversing switch 109, by and conductor 118, through the armature $a$ and resistance 107, to the opposite side of the main line as already traced. Thereupon the pilot motor tends to operate in an opposite direction to that in which it last operated and in a direction to move the contact member 44 in a clockwise direction; or, in other words, in the same direction that the spider carrying the contact ring is moved. Owing to the position of the escapement pawl, however, the pilot motor will at first be ineffective to operate the contact member 44. However, as soon as the working motor 101 commences to operate, it causes operation of the commutator 106, which alternately shortcircuits the escapement magnets, thereby causing the escapement pawl to be actuated to permit the contact member 44 to be moved in a step-by-step manner. Inasmuch as the commutator is operated by the working motor, it will be apparent that the escapement mechanism will so control the operation of the automatically operated contact member 44 as to cause the same to move in synchronism with the working motor. The contact member 44 will continue to move until the brushes 43 and 42 thereof disengage the contact segments 37ª and 36, whereupon the operating windings of the starting device 104 and the switch 102 will be deënergized. This, of course, reinserts resistance 105 to slow down the motor and then opens the motor circuit. The working motor will thereby be brought to rest. The reversing switch 109 for the pilot motor is of such construction that it will remain in the position to which it was last operated, thereby maintaining the circuit of the pilot motor closed after the main motor circuit is opened. Consequently, so long as the main motor continues to operate, the commutator driven thereby will cause the escapement mechanism to permit continued movement of the contact member 44. Thus it will be seen that the movable contact member 44 will be maintained in step with the working motor even though the motor continues to operate after the circuit is opened.

As previously set forth, the distance to which the spider carrying the contact rings is moved determines the range of operation of the working motor, and this, of course, is obvious from the operation just described. If it be desired to operate the working motor for a short period, then the contact rings are moved only a short distance. If it is desired to increase the operating period of the working motor, then the contact rings should be moved a greater distance.

Movement of the contact rings or segments in an anti-clockwise direction will cause successive energization of the operating windings of switch 103 and the starting device 104. The circuit of the winding of switch 103 may be traced from conductor 123, through said winding by conductor 140, to contact segment 37ᵇ, through the contact member 44 to contact ring 35, and thence to the opposite side of the supply circuit. Thereupon the switch 103 responds, thereby closing circuit through the working motor. Under these conditions, however, current will flow through the armature of the working motor in an opposite direction to that previously described, the direction of flow of current through the field winding remaining the same. This, of course, causes reversal of the working motor. The starting device 104 operates in the manner previously set forth to bring the motor up to normal speed. Also closure of the switch 103 causes energization of the winding 111 of reversing switch 109, thereby reversing the flow of current through the armature of the pilot motor. This, of course, causes the pilot motor to operate the contact member 44 in an opposite direction to that previously described, and again in the same direction that the contact segments are moved. The operation under these conditions is the same as that previously described, except that the working motor is caused to operate in a reverse direction.

As has been pointed out, the reversing switch 109 is electrically interlocked with the reversing switches of the main motor, and, consequently, the pilot motor can be reversed only upon a reversal of the flow of current through the main motor. This is a very important feature inasmuch as it prevents the automatically operated contact member 44 from being thrown out of step with the main motor upon sudden reversal of the spider carrying contact rings. In other words, after connections are once established for the pilot motor, the same will continue to operate in the same direction, irrespective of further operation of the contact rings, until the direction of operation of the main motor is reversed. Consequently, if the member carrying the contact rings is moved in one direction and then quickly moved in an opposite direction, the movable contact member 44 will continue to operate in a direction in which the contact rings were first operated until the direction of operation of the main motor is reversed, and then the contact member 44 will be moved in an opposite direction. If provisions were not made for such a contingency, and the operation of the movable contact member 44 was reversed immediately upon reversal of the contact rings, then the direction of operation of the contact member 44 would be reversed while the motor was operating in the direction in which it was first started. This is due to the fact that the electrical conditions of the motor prevent a sudden reversal thereof, and, consequently, reversal of the motor would lag behind reversal of the contact member 44 with the obvious result that the motor and the contact member 44 would be thrown out of step. This, of course, would upset the operation of the whole system and require readjustment of the parts in order to obtain proper coöperation of the same.

Having thus described my invention, what I desire to secure by Letters Patent, is:—

1. In an electric switch, in combination, coöperating contact members, movable relatively to one another, one of said members being movable at will, electroresponsive means for operating the other of said members, and an escapement mechanism for controlling the speed of said last mentioned member.

2. In a motor controller, in combination, coöperating contact members, movable relatively to one another, one of said members being movable at will, electroresponsive means for operating the other of said members, and an escapement mechanism for controlling said last mentioned member to cause the same to operate in synchronism with the motor.

3. In a motor controller, in combination, coöperating contact members, movable relatively to one another, one of said members being movable at will, electroresponsive means for operating the other of said members, and an electromagnetically operated escapement mechanism controlling said last mentioned member to cause the same to operate in synchronism with the motor.

4. In a motor controller, in combination, coöperating contact members, one of said contacts being movable at will in opposite directions and the other being adapted to automatically follow the first mentioned member, and means for retarding the operation of said automatically operated member to cause the same to move in synchronism with the motor, said first mentioned member being ineffective to change the direction of operation of said automatic member until the direction of operation of the motor is reversed.

5. In a motor controller, in combination, coöperating contact members, one of said members being movable at will in opposite directions to cause the motor to operate in either direction, means for automatically operating the other member in either direction according to the direction of operation of the motor, said means being ineffective to reverse the direction of operation of said last mentioned member until the direction of operation of the motor is reversed, and means for controlling the operation of said automatic member to cause the same to operate in synchronism with the motor.

6. In a motor controller, in combination, coöperating contact members, one of said members being movable at will in opposite directions to cause the motor to operate in either direction, means for automatically operating the other member in either direction according to the direction of operation of the motor, said means being ineffective to reverse the direction of operation of said last mentioned member until the direction of operation of the motor is reversed, and an escapement mechanism controlling said automatic member to cause the same to operate in synchronism with the motor.

7. In a motor controller, in combination, coöperating contact members, one of said members being movable at will in opposite directions to cause the motor to operate in either direction, means for automatically operating the other member in either direction according to the direction of operation of the motor, said means being ineffective to reverse the direction of operation of said last mentioned member until the direction of operation of the motor is reversed, and an electromagnetically operated escapement mechanism controlling said automatically operated member to cause the same to operate in synchronism with the motor.

8. In a motor controller, in combination, coöperating contact members, one of said members being movable at will in opposite directions to cause the motor to operate in either direction, electroresponsive means for operating the other member in either direction according to the direction of operation of the motor, and an escapement mechanism controlling said last mentioned member to cause the same to operate in synchronism with the motor.

9. In a motor controller, in combination, coöperating contact members, one of said members being movable at will to start the motor, a pilot motor for operating the other contact member, and means for retarding said motor operated member to move in synchronism with the main motor.

10. In a motor controller, in combination, coöperating contact members, one of said members being movable at will in opposite directions to cause the motor to operate in either direction, a pilot motor for operating the other member in either direction according to the direction of operation of the main motor, and an escapement mechanism controlling said motor operated member to cause the same to move in synchronism with the main motor.

11. In a motor controller, in combination, coöperating contact members, one of said members being movable at will in opposite directions to cause the motor to operate in either direction, a pilot motor for operating the other member to follow said first mentioned member, means insuring operation of said pilot motor in the same direction until the direction of operation of the main motor is reversed, and an escapement mechanism for said motor operated member to insure movement thereof in synchronism with the main motor.

12. In a motor controller, in combination, two coöperating contact members, one of said members being movable at will in opposite directions to cause the motor to operate in either direction, a pilot motor for operating the other contact member in either direction according to the direction of operation of the main motor, an escapement mechanism insuring operation of said motor operated member in synchronism with the main motor, and electromagnetic means controlling said pilot motor to reverse the same only upon reversal of the main motor.

13. In a motor controller, in combination, a casing, two independently movable coöperating contact devices within said casing, one operable at will and the other operable automatically in synchronism with the motor, two concentrically mounted revoluble pointers exterior to said casing and movable in a different plane from said contact members and operative connections for causing each of said pointers to move in synchronism with one of said contact devices.

14. In a motor controller, in combination, two independently movable coöperating contact devices vertically mounted within said casing, a manual operating member operatively connected to one of said contact devices to move the same at will, means within said casing for automatically operating the other of said devices, two indicating pointers exterior to the top of said casing and movable in substantially horizontal planes, one of said pointers being operatively connected with said operating member and the other operatively connected to said means to insure movement of said pointers in synchronism with said contact devices.

15. In a motor controller, in combination, a casing, a horizontally disposed shaft within said casing, two independently movable coöperating contact devices mounted upon said shaft, one of said devices being fixed to said shaft, means within said casing for automatically revolving said shaft, a spindle perpendicularly disposed to said shaft, a gear and segment operatively connecting said spindle to said shaft, a pointer fixed to said spindle exterior to said casing, an independently movable pointer mounted concentrically with said first mentioned pointer and a manually operated member operatively geared to the second contact device and to said second mentioned pointer to move the same in synchronism.

16. In a motor controller, in combination, a casing, a pair of coöperating contact members revolubly supported within said casing, means exterior to said casing for rotating one of said members at will, an electroresponsive device supported within said casing for revolving the other member, and an escapement mechanism also supported within said casing for controlling the speed of said last mentioned member.

17. In a motor controller, in combination, a casing, a pair of coöperating contact members revolubly supported within said casing, means exterior to said casing for rotating one of said members at will, an electroresponsive device supported within said casing for revolving the other member, an escapement mechanism also supported within said casing for controlling the speed of said last mentioned member, and indicating devices exterior to said casing, each of said indicating devices being movable in synchronism with one of said contact members.

18. In a motor controller, in combination, a casing, a frame supported within said casing, coöperating contact members revolubly supported by said frame, means exterior to said casing for revolving one of said members at will, a motor supported by said frame, gearing for causing said motor to rotate the other contact member, an escapement mechanism connected with said motor operated member, and electromagnets supported by said frame for operating said escapement mechanism.

19. In a motor controller, in combination, a shaft, two revoluble coöperating contact members carried thereby, one of said members being movable at will, a gear segment carried by the other of said members, a spindle revolubly mounted in proximity to said gear segment, a pinion fixed to said spindle and meshing with said gear segment, an escapement wheel fixed to said spindle, means for automatically rotating said spindle to operate said second mentioned contact member and electromagnetically operated pawls coöperating with said escapement wheel to control the speed of said automatically operated contact member.

20. In a motor controller, in combination, a casing, a frame supported therein, a horizontal shaft revolubly supported by said frame, a contact member revolubly mounted on said shaft and having a gear segment thereon, a pinion meshing with said gear segment, a spindle projecting through said casing and having said pinion fixed thereon, an operating member fixed to said spindle exterior to said casing, a contact member fixed to said shaft and having contacts directly engaging said first mentioned contact member, said second mentioned member having a gear segment thereon, a counter shaft having a pinion fixed thereto for meshing with said gear segment, an escapement wheel fixed to said counter shaft, pawls for engaging said escapement wheel, electromagnets carried by said frame for operating said pawls, a motor carried by said frame for operating said counter shaft, a vertically disposed spindle geared to said first mentioned shaft and projecting through said casing, a pointer fixed to said vertical spindle exterior to said casing, a sleeve loosely mounted on said vertical spindle and having a pointer fixed thereto exterior to said casing, and gearing for causing the operating pinion of said first mentioned contact member to rotate said sleeve.

In witness whereof, I have hereunto subscribed my name in the presence of two witnesses.

THOMAS E. BARNUM.

Witnesses:
   FRANK H. HUBBARD,
   S. W. FITZGERALD.